E. A. H. JACOB.
COTTON TRAMPER.
APPLICATION FILED AUG. 25, 1919.

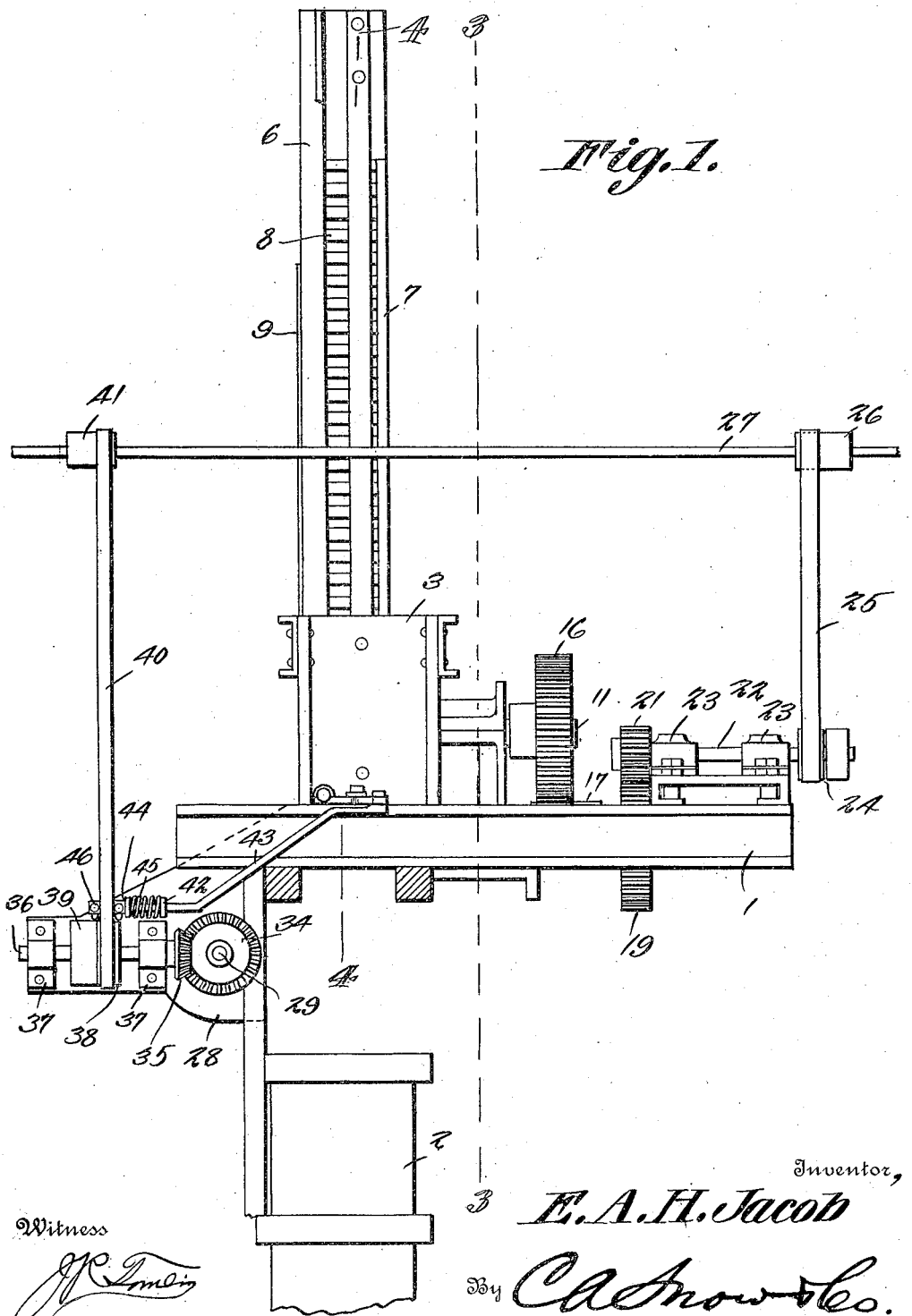

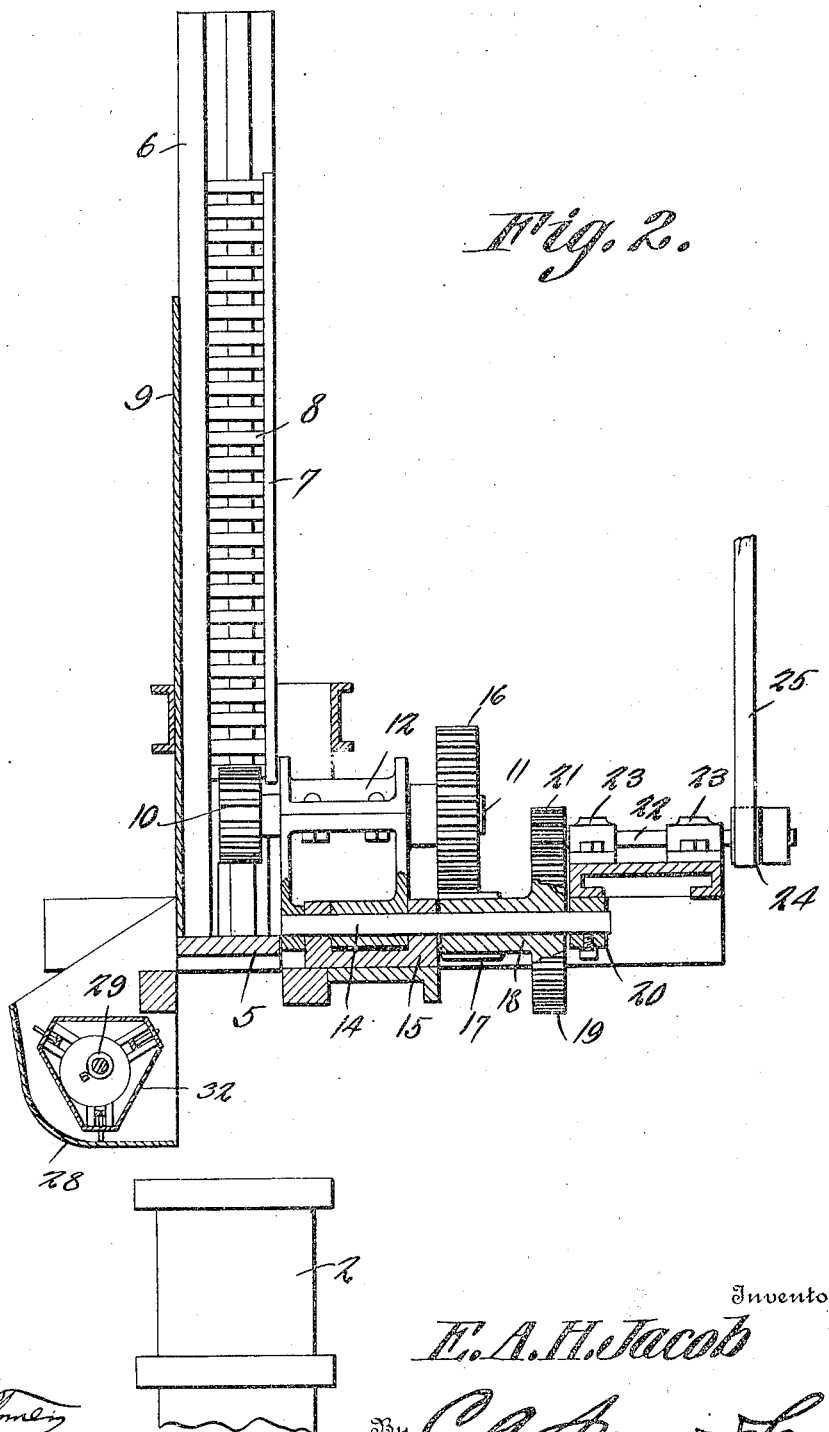

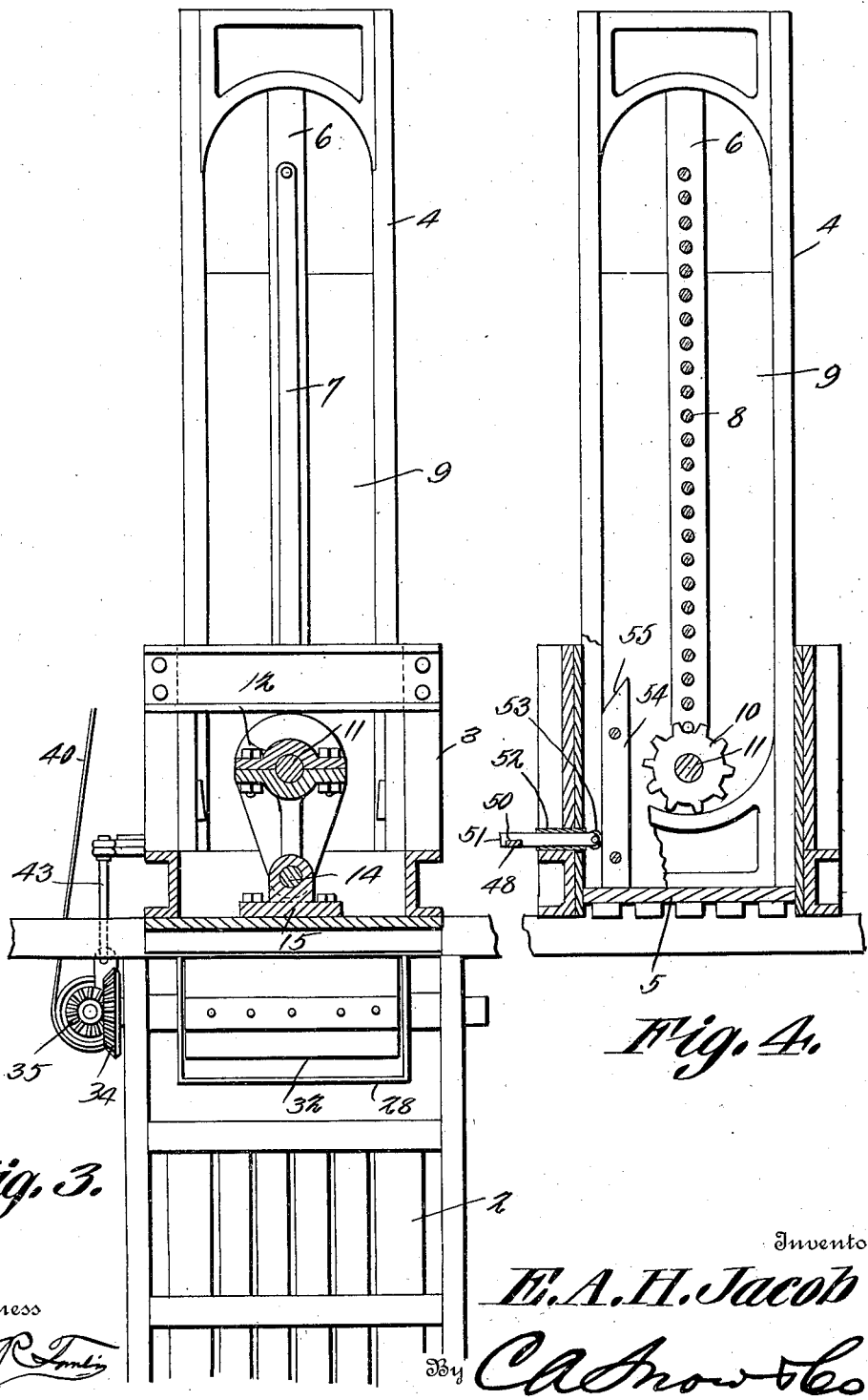

1,352,129.

Patented Sept. 7, 1920.
4 SHEETS—SHEET 4.

Inventor
E. A. H. Jacob
By C. A. Snow & Co.
Attorneys.

Witness

UNITED STATES PATENT OFFICE.

ERNST A. H. JACOB, OF SAN ANTONIO, TEXAS.

COTTON-TRAMPER.

1,352,129.  Specification of Letters Patent.  Patented Sept. 7, 1920.

Application filed August 25, 1919. Serial No. 319,556.

*To all whom it may concern:*

Be it known that I, ERNST A. H. JACOB, a citizen of the Republic of Germany, residing at San Antonio, in the county of Bexar and State of Texas, have invented a new and useful Cotton-Tramper, of which the following is a specification.

The device forming the subject matter of this application is a cotton tramper of that general type in which a vertically moving plunger operates in a baling trunk, means being provided for feeding the cotton into the trunk below the plunger.

One object of the invention is to provide a novel mechanism for operating the plunger.

Another object of the invention is to provide novel means whereby the feeding mechanism will operate automatically at the proper time.

It is within the province of the disclosure to improve generally and to enhance the utility of devices of that sort to which the invention appertains.

With the above and other objects in view, the invention consists in the novel construction and arrangements of parts hereinafter described, depicted in the drawings, and claimed, it being understood that, within the scope of what is claimed, changes falling within the skill of a mechanic, may be made without departing from the spirit of the invention or placing the utility thereof in jeopardy.

In the drawings which form a part of this application,

Figure 1 shows in side elevation, a cotton tramper embodying the invention;

Fig. 2 is a longitudinal section of the cotton tramper;

Fig. 3 is a section taken on the line 3—3 of Fig. 1;

Fig. 4 is a section taken on the line 4—4 of Fig. 1;

Figure 5:
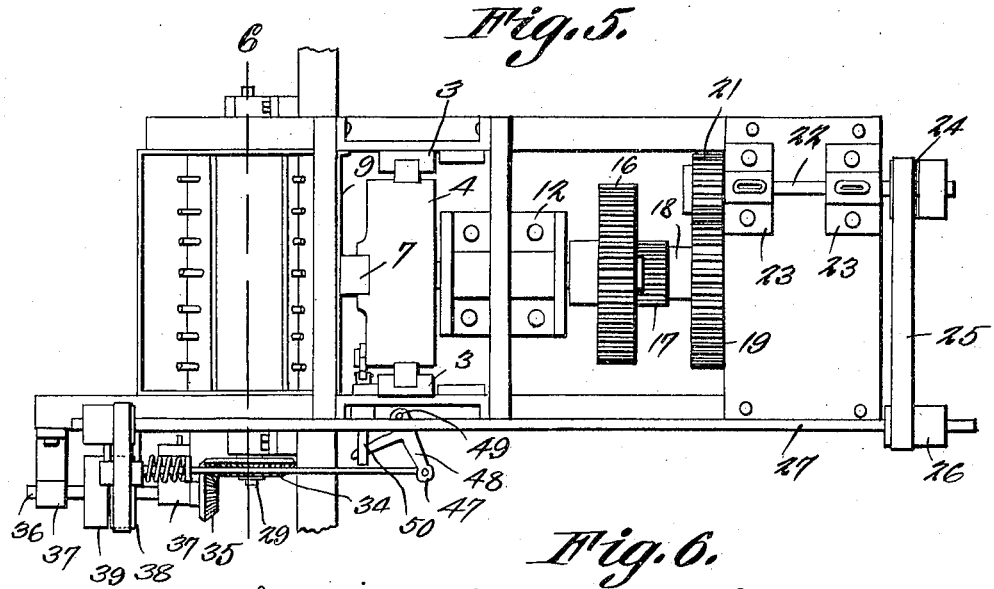
Fig. 5 is a top plan of my improved cotton tramper.

In carrying out the invention there is provided a frame, denoted generally by the numeral 1. The frame 1 may be of any desired construction. Below the frame is located a vertical baling trunk 2. The frame 1 is supplied with guides 3 in which a plunger, denoted generally by the numeral 4 is mounted for vertical reciprocation, the plunger 4 including a foot 5 operating in the baling trunk 2. The plunger 4 includes a bar 6 and a bar 7 connected by pins 8, the bars 6 and 7, together with the pins 8 constituting a double-sided rack. The bar 7 carries a plate 9, coacting with a hopper 28 hereinafter described, to prevent the cotton in the hopper from passing into the baling trunk at times, during the operation of the machine, as will be described more fully hereinafter.

The double-sided rack 6—7—8 coöperates with a pinion 10 carried by a shaft 11 journaled in the upper end of a radius arm 12, mounted at its lower end to swing transversely, on a support 14, in the form of a horizontal rod carried by a block 15 mounted on the frame 1. A gear wheel 16 is secured to the shaft 11 and meshes into a pinion 17 on the hub 18 of a gear wheel 19, the hub 18 and the gear wheel being journaled on the support 14, and being held thereon by a set collar 20 or the like.

The gear wheel 19 meshes into a pinion 21 on a shaft 22 journaled in bearings 23 on the frame 1. The outer end of the shaft 22 carries pulleys 24, one of which is fixed, the other of which is loose, the pulleys 24 coacting with a belt 25 engaging a pulley 26 on a line shaft 27.

The hopper 28, hereinbefore alluded to, discharges into the baling trunk 2, adjacent the top of the baling trunk. A shaft 29 is fixed in the hopper 28 and in the frame 1 and extends lengthwise of the hopper. The numeral 31 denotes a drum operating in the hopper, the drum including heads 30 and a shell 32, the heads 30 of the drum being rotatably mounted on the shaft 29, one head carrying a sleeve 33 to which a beveled gear wheel 34 is attached. The beveled gear wheel 34 meshes into a beveled pinion 35 on a shaft 36 mounted to rotate in bearings 37 carried by the frame 1. The shaft 36 is provided with a fixed pulley 38 and with a loose pulley 39, the pulleys coöperating with a belt 40 engaging a pulley 41 on the line shaft 27.

The frame of the machine carries a guide 42 in which a rod 43 is mounted to reciprocate. The rod 43 has an abutment 44. A helical compression spring 45 surrounds a portion of the rod 43 and is located between the abutment 44 and the guide 42, the function of the spring being to move the rod 43 lengthwise in one direction. The rod 43 carries fingers 46 located on opposite sides of the belt 40. The structure above described constitutes a part of a belt shifter, as will be understood readily when the operation of the device is gone into. One end of the rod 43 is pivoted at 47 to one arm of a bell crank lever 48 fulcrumed at 49 on the frame 1, the other arm of the bell crank lever being loosely received in a notch 50 formed in a slide rod 51 mounted for endwise reciprocation in a guide 52, carried by the frame 1. The inner end of the slide rod 51 carries a roller 53 adapted to coact with an actuating strip 54 constituting a part of the plunger 4, the actuating strip including a beveled end 55.

The heads or ends 30 of the drum 31 are provided with guides 56. Carriers 57, in the form of bars, extend longitudinally of the drum within the same, and are supplied with inwardly projecting ends 58 mounted to slide between the guides 56. The carriers 57 are provided with teeth 59 extended outwardly through the shell 32 of the drum and slidable therein. Disks 60, are mounted eccentrically on the fixed shaft 29 and are supplied with flanges 61 defining a cam track receiving rollers 62 on the ends 58 of the parts 57.

In practical operation, rotation is imparted to the shaft 22 from the line shaft 27 by way of the pulley 26, the belt 25 and one of the pulleys 24. When the shaft 22 is rotated, the pinion 21 is rotated, rotation being imparted to the gear wheel 19 and from the gear wheel 19 motion is transmitted to the shaft 11 by way of the pinion 17 and the gear wheel 16. When the shaft 11 is rotated, the pinion 10 coöperates with the rack formed by the pins 8. The rack and the plunger 4 are operated, the pinion 10 coöperating with one side of the rack and then with the other side of the rack, it being possible for the pinion 10 to pass from one side of the rack to the other across the ends of the rack because the radius arm 12 is mounted for swinging movement on the member 14. During the time that the radius arm 12 is swinging as aforesaid, the gear wheel 16 on the shaft 11 remains in mesh with the pinion 17 on the hub 18 of the gear wheel 19. A continuous movement, therefore is imparted to the pinion 10 and this movement is communicated to the plunger 4 by way of the rack 8, the plunger reciprocating continuously, and the foot 5 of the plunger operating in the trunk 2.

During the major portion of the upward stroke of the plunger 4, and during the major portion of the downward stroke thereof, the rotary feeder, comprising the drum 31 and coöperating parts, is at rest, because the belt 40 is engaged with the loose pulley 39. As the plunger 4 moves toward the end of its upward stroke, the strip 54 coöperates with the roller 53 on the end of the member 51, and the member 51 is thrust outwardly, the bell crank lever 48 being tilted on its fulcrum 49 and the rod 43 being retracted against the action of the spring 45, the fingers 46 on the rod 43 sliding the belt 40 over from the loose pulley 39 to the fixed pulley 38 on the shaft 36. Rotation, therefore, is imparted to the shaft 36 while the plunger 4 is at the upper end of its travel, and for a short time, while the plunger is beginning its downward movement.

Figure 6:
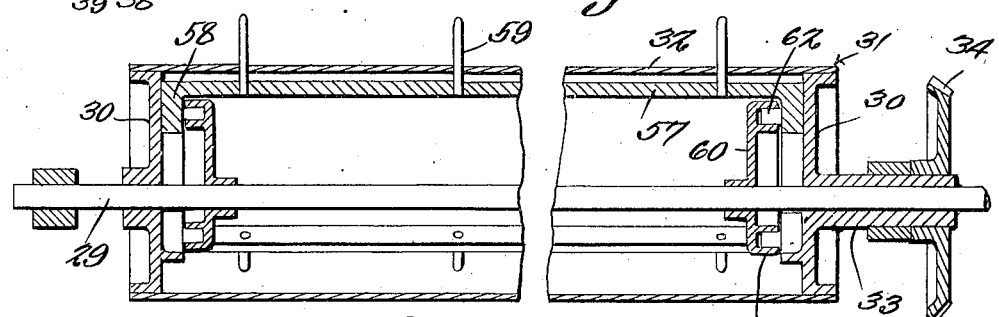
Fig. 6 is a section taken on the line 6—6 of Fig. 5.
Figure 7:
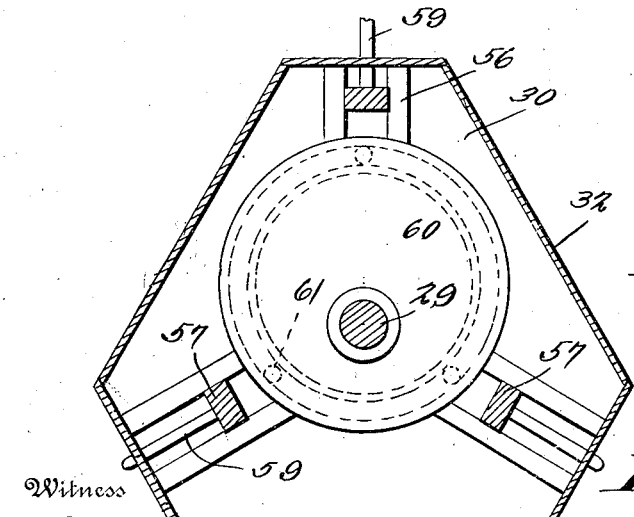
Fig. 7 is a section taken on the line 7—7 of Fig. 5.

When the shaft 36 is rotated as aforesaid, the beveled pinions 35 and 34 impart rotation to the drum 31. When the drum 31 is rotated, the rollers 62 on the ends 58 of the members 57 ride in the cam tracks 61 of the disks 60 which are fixed to the shaft 29, this latter element being fixed, it being recalled. It will be obvious that the coöperation between the parts is such that the fingers 59 will be advanced and retracted, the cotton being swept from the hopper 28 into the baling trunk 2 during the time that the plunger 4 is completing its upward stroke and beginning its downward stroke, it being recalled that it is during this interval that the strip 54 engages the roller 53 on the slide rod 51 and forces the same outwardly, as aforesaid, to shift the belt 40 from the loose pulley 39 on the shaft 36 to the fixed pulley 38 thereon. When the roller 53 on the inner end of the slide rod 51 is no longer in engagement with the strip 54, then the spring 45 reasserts itself and moves the rod 43 to the left (Fig. 1), the fingers 46 on the rod shifting the belt 40 from the fixed pulley 38 to the loose pulley 39 and causing the rotation of the feeding drum 31 to stop. As the plunger 4 moves downwardly, the plate 9 constitutes a closure for the inner side of the hopper 28 and prevents the cotton from moving against the side of the descending plunger 4. The feeding mechanism including the drum 31, is idle during the major portion of the downward stroke of the plunger 4 and during the major portion of the upward stroke thereof and, therefore, there is no positive feeding of the cotton from the hopper 28 into the trunk 2 saving at the times hereinbefore pointed out, but the plate 9, as it descends with the plunger 4, serves to prevent any loose cotton which may be at the mouth or outlet of the hopper 28 from passing out of the hopper against the side of the plunger 4 as the latter element moves upwardly or downwardly. The rotary feeder shown in Figs. 6 and 7 begins to turn at the time that the foot 5 of the plunger 4 arrives at the bottom of the hopper 28 on the upstroke, and continues to turn until the foot has arrived nearly at the bottom of the hopper on the downstroke.

Having thus described the invention, what is claimed is:—

1. A cotton tramper comprising a frame; a trunk; a plunger mounted to reciprocate in the frame and coöperating with the trunk, the plunger including a double-sided free-ended rack; a radius arm mounted at its lower end to oscillate in an arc on the frame; a pinion carried by the upper end of the radius arm and coöperating with the rack; and means for rotating the pinion.

2. In a cotton tramper, a frame; a trunk; a plunger slidable in the frame and coöperating with the trunk; a hopper discharging into the trunk; a fixed straight shaft; a drum located in the hopper and comprising ends and a body, the ends of the drum being rotatably mounted on the shaft and being provided with guides; carriers extended longitudinally of the drum within the same and having their ends mounted to slide in the guides; fingers mounted on the carriers and slidable in the body of the drum; eccentric means on the shaft and coöperating with the ends of the carriers to advance and retract the carriers when the drum is rotated; mechanism for rotating the drum; and means operated by the plunger for rendering said mechanism inactive during a portion of the travel of the plunger.

3. A device of the class described, constructed as set forth in claim 2 and further characterized by the fact that the eccentric means embodies disks fixed to the shaft and provided with cam tracks, the ends of the carriers being supplied with projections traversing the cam tracks.

4. A cotton tramper comprising a frame; a trunk; a plunger mounted to reciprocate in the frame and coöperating with the trunk; an actuating member carried by the plunger and having a beveled surface; a first rod mounted for right line sliding movement in the frame and having its inner end located in the path of the beveled surface of the actuating member; a bell crank lever fulcrumed on the frame, one end of the bell crank lever being slidably connected with the rod; a second rod mounted for longitudinal reciprocation and connected to the other end of the bell crank lever; spring means assembled with the last specified rod for operating the same to dispose the inner end of the first rod in the path of the beveled surface of the actuating member; a rotary feeder discharging into the trunk; a belt; means for connecting the belt operatively with the feeder; and a belt shifter on the second rod and coacting with the belt.

In testimony that I claim the foregoing as my own, I have hereto affixed my signature in the presence of two witnesses.

ERNST A. H. JACOB.

Witnesses:
MASON B. LAWTON,
IVY E. SIMPSON.